July 4, 1961 C. A. CRAFTS 2,991,354

AUTOMATIC FREQUENCY CONTROL FOR PHASE SHIFT KEYING COMMUNICATION SYSTEM

Filed April 27, 1959 2 Sheets-Sheet 1

July 4, 1961 C. A. CRAFTS 2,991,354

AUTOMATIC FREQUENCY CONTROL FOR PHASE SHIFT KEYING COMMUNICATION SYSTEM

Filed April 27, 1959 2 Sheets-Sheet 2

United States Patent Office 2,991,354
Patented July 4, 1961

2,991,354

AUTOMATIC FREQUENCY CONTROL FOR PHASE SHIFT KEYING COMMUNICATION SYSTEM

Cecil A. Crafts, Santa Ana, Calif., assignor to Robertshaw-Fulton Controls Company, Richmond, Va., a corporation of Delaware Filed Apr. 27, 1959, Ser. No. 808,990
8 Claims. (Cl. 250—8)

This invention relates generally to phase shift modulated carrier wave receivers and more particularly to an automatic frequency control (AFC) system for such receivers.

The prior art discloses AFC systems for developing signals suitable for tuning a receiver to some fundamental input frequency in response to the phase relationship between an input signal to a resonant circuit and an output signal from the resonant circuit. Such prior art systems are, however, concerned with obtaining an output signal from the resonant circuit which is of the same frequency as the input signal and retrieving from the input signal a modulating signal which is symmetrical about some particular phase position. Moreover, these systems are not effective unless they are utilized with essentially sinusoidal modulation, in that any nonsymmetry in the modulation affects the level of the signal utilized to tune the receiver.

In one aspect of the present invention, means and circuitry are disclosed for automatically tuning a receiver to a multiple frequency of a nonsinusoidally modulated carrier frequency signal. More particularly, the receiver includes means and circuitry for automatically tuning a resonant circuit to an odd harmonic of a phase shift modulated input signal in response to the phase relationship between the input signal and the odd harmonic signal derived from the resonant circuit.

Accordingly, one object of this invention is to automatically tune a receiver to an odd harmonic of a fundamental input signal.

Another object of this invention is to tune a receiver to an odd harmonic of a fundamental phase shift modulated carrier frequency signal.

A further object of this invention is to employ two different, harmonically related, signals for accurately tuning a phase shift keying receiver to a fundamental input signal.

A still further object of this invention is to employ a limited odd harmonic signal of a fundamental input signal for automatically tuning a phase shift keying receiver to the fundamental input signal.

Still another object of this invention is to increase the sensitivity of a phase shift keying receiver.

Figure 1:
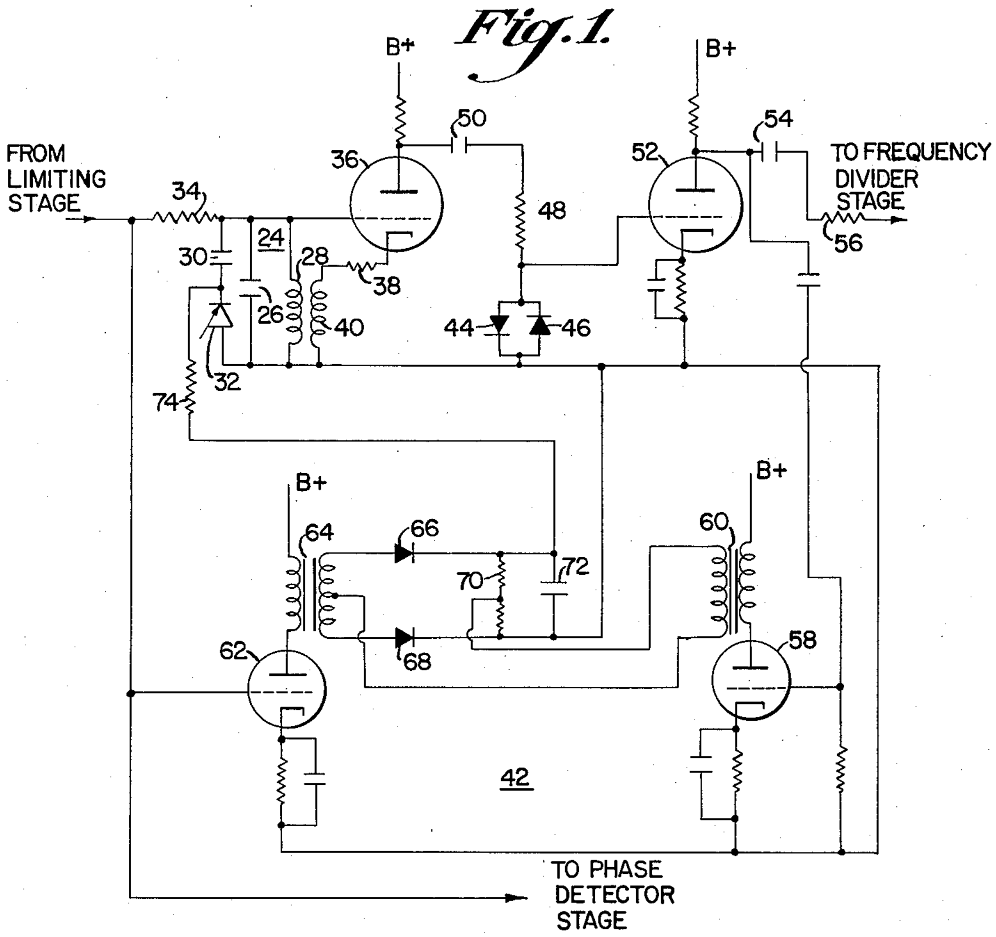
Figure 3:
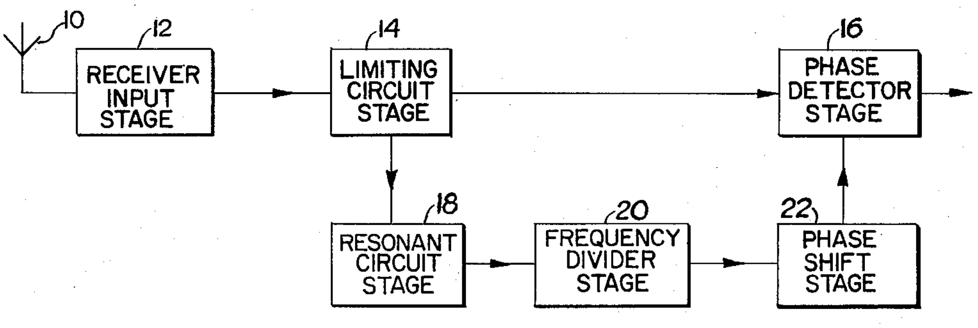

These and other objects and advantages of the present invention will become apparent from the following description taken in connection with the accompanying drawings wherein:

FIG. 1 is a diagrammatic representation of a preferred embodiment of this invention;

FIGS. *2a*–*2h* show the relationship between various wave forms which characterize the present invention; and FIG. 3 is a block diagram of a receiver utilizing the circuitry of the present invention.

The receiver shown in FIG. 3 embodies the principles of the present invention and is adapted to retrieve intelligence from a carrier wave having different input conditions or phase positions. The receiver circuitry includes a receiver antenna 10 which samples the incoming modulated carrier wave which, for the purposes of illustration, may take the form of a sinusoidal signal having phase displacements of 0°, 120°, and 240° with respect to zero time. The receiver input stage may, however, receive energy directly from a suitable transmitter (not shown) via a coaxial cable or the like, if it is desirous to dispense with the antenna 10.

The signal received by the antenna 10 is applied to a receiver input stage 12. The stage 12 may include suitable stages of amplification for compensating for any reductions in signal strength which may have occurred during the propagation of the carrier wave and additionally may include a suitable band pass filter. Moreover, stage 12 may include suitable impedance matching circuitry and the like for insuring optimum energy transfer from the antenna or the cable as the case may be.

The modulated signal which occurs at the output of the stage 12 is applied directly to a limiting or squaring circuit 14 and directly therefrom to a phase detector stage 16. In order to retrieve the information implicit in the modulated carrier, means are provided within the receiver circuitry for developing a receiver signal having a wave form identical with that of the carrier wave before it has been keyed or modulated.

In order to develop such a reference signal, the output from limiting or squaring circuit 14 is applied to a resonant circuit 18, which will hereinafter be described in detail and which is tuned to the third harmonic of the carrier wave frequency. From the resonant circuit 18, the triple frequency output wave is applied to a frequency divider 20. The divider 20 may comprise a conventional countdown circuit which has the capacity to produce an output signal at a frequency which is a submultiple of the input frequency.

The output potential of the frequency divider 20 comprises an oscillatory signal having the same frequency as the carrier wave and a constant phase. This signal is utilized as a reference signal within the receiver after passage through a phase shifting stage 22. The phase shifting stage 22 includes circuitry and components for shifting the phase of the oscillatory input signal by 30°. By this means, the output of the divider is displaced 90° out of phase with the input signal at one of the input phase conditions. Comparison of the phase shifted reference signal produced by stage 22 with the three phase modulated carrier is accomplished within the phase detector stage 16. For the input phase with which the reference signal exhibits a 90° phase displacement, the output of the phase detector 16 will be zero. On the other hand, the other two phase modulated positions of the carrier wave will result in positively and negatively polarized output potentials, respectively. Thus, by this means the transfer of information with the three input conditions or phase positions of the carrier wave is provided.

The circuitry and interconnections of the resonant circuit 18 which produces the triple frequency reference signal is set forth in detail in FIG. 1 and includes a parallel resonant circuit 24 including a capacitor 26 and a coil 28. A series arrangement comprising a fixed capacitor element 30 and a variable capacitor element 32, the function of which will hereinafter be explained in detail, is connected in parallel with the parallel resonant circuit 24. The resistor 34 connects one end of parallel resonant circuit 24 to the output of limiting circuit stage 14.

The parallel resonant circuit 24 is characterized by a high Q and is tuned to the third harmonic of the frequency received by the antenna 10. This high Q resonant circuit carries on the action of deriving a reference signal during momentary interruptions which may occur in the reception of the carrier signal as a result of keying transients or atmospheric fading. This, of course, is because of the cyclic interchange of energy which occurs between the inductive and capacitive elements in such a resonant circuit.

The effective Q obtainable with standard inductance elements is, however, often insufficient to produce optimum performance, particularly during conditions of ionospheric perturbations and in the presence of extreme noise. Thus, in order to increase the effective Q of resonant circuit 24, means are provided to reinforce the signal produced therein. To this end, the one end of resonant circuit 24 is connected to the control electrode of a conventional three electrode vacuum tube 36 which is connected as a cathode follower. The anode of tube 36 is shown connected to a suitable source of B+ potential and the cathode thereof is connected to the other end of resonant circuit 24 through a series circuit comprising a resistor 38 and a coil 40 which is inductively coupled to the coil 28.

Tube 36 will amplify the triple frequency output signal from resonant circuit 24 and it should be apparent that the amplified signal appearing at the cathode of tube 36 will be of a proper phase to reinforce the signal appearing in coil 28. Thus, a portion of the signal from tube 36 is fed back through coil 40 in a proper phase relation to provide a regenerative feedback in the resonant circuit 24. The amount of feedback is controlled by the resistor 38.

As a result of the regenerative feedback, resonant circuit 24 will have a very high Q and a very narrow response curve. In order to obtain optimum performance and sensitivity, means are provided to automatically maintain parallel resonant circuit 24 accurately tuned to a frequency three times that of the input signal received at the antenna 10. This means takes the form of an AFC discriminator, indicated generally at 42, which is connected to compare the phase of the output signal from limiting stage 14 with the phase of the triple frequency signal output from tube 36 and derive from the phase relationship of these signals a resultant signal suitable for application to the capacitor element 32.

After amplification in the tube 36, the signal from resonant circuit 24 is applied to a limiting circuit comprising a pair of oppositely poled and serially connected diode elements 44, 46. One common junction between diode elements 44, 46 is connected to the anode of tube 36 by a resistor 48 and a capacitor 50 while the other common junction between diode elements 44, 46 is connected to the junction common to coil 40 and resonant circuit 24.

The limited signal from diode elements 44, 46 is applied directly to the control electrode of a conventional three element vacuum tube 52 for amplification. The amplified triple frequency signal from tube 52 is coupled directly to the frequency divider stage 20 by a capacitor 54 and a resistor 56. Additionally, the triple frequency signal appearing at the anode of tube 52 is applied to the control electrode of a conventional three element vacuum tube 58 for further amplification. The triple frequency square wave energizing potential present at the control electrode of tube 58 produces a square wave current in the primary winding of a transformer 60, connected in the anode circuit of tube 58, for comparison with the limited signal from limiting stage 14.

The signal from limiting stage 14 is similarly applied to a control electrode of a conventional three element vacuum tube 62 for amplification. A similar square wave current is produced in the primary winding of a transformer 64, connected in the anode circuit of tube 62. The secondary windings of transformers 60 and 64 are interconnected in a phase detector circuit which is able to compare the phase of the triple frequency reference signal with that of the limited signal from limiting circuit 14. To this end, the ends of the secondary winding of transformer 64 are connected to similar poles of similar diode elements 66, 68. The other poles of diode elements 66, 68 are connected to the opposite ends of a center tapped resistor 70. The secondary winding of transformer 64 is provided with a center tap and the secondary winding of transformer 60 is connected between this center tap and the center tap of resistor 70. A capacitor 72 is connected across the resistor 70 and has one plate connected directly to one plate of capacitor element 32 and the other plate connected to the other plate of capacitor element 32 through a resistor 74.

Figure 2:
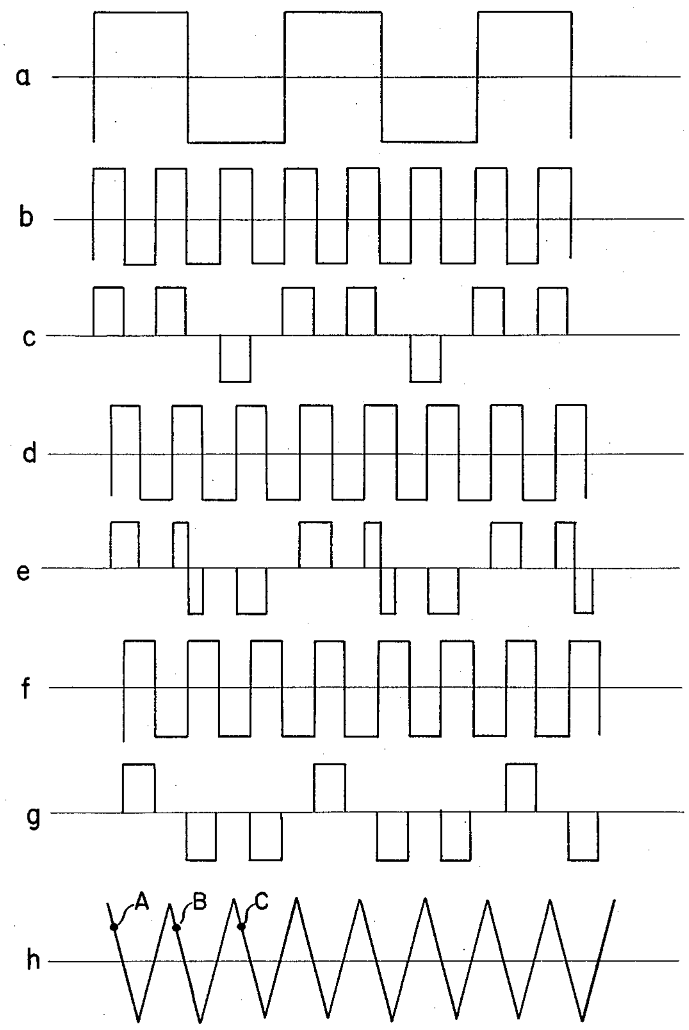

The interrelationship between the various wave forms which characterize the present invention are illustrated in FIGS. 2*a*–2*h*. Thus, in FIG. 2*a*, a limited carrier frequency signal from limiting circuit stage 14 is illustrated for a 0° phase displacement with respect to zero time. FIG. 2*b* illustrates the limited triple frequency signal derived from the limiting circuit comprising diode elements 44, 46 upon application of the signal of FIG. 2*a* to the resonant circuit 24.

The signals of FIGS. 2*a* and 2*b* are impressed upon the AFC discriminator 42 and the signal of FIG. 2*c* will appear at the capacitor 72 upon comparison of these signals. Capacitor 72 integrates the signal of FIG. 2*c* and it should be apparent that the net result of this integration will result in a positive D.C. voltage being applied to the capacitor element 32.

Capacitor element 32 is variable in capacity in response to variations in applied D.C. bias and is preferably made of wafers of nonlinear dielectric, such as barium titanate, sandwiched between two metal plates to which the D.C. bias is applied. Alternatively, capacitor element 32 may take the form of a reverse biased junction diode, neon bulbs surrounded by a pair of metal plates or other devices, such as a conventional reactance tube circuit, which are well known in the art to exhibit variations in reactance in response to variations in an applied D.C. potential.

It is apparent that variations in the capacitance of capacitor element 32 varies the tuning of resonant circuit 24. Thus, resonant circuit 24 is accurately tuned to the triple frequency of the incoming signal from limiting circuit 14 when the signals of FIGS. 2*a* and 2*b* are impressed upon AFC discriminator 42.

To illustrate the operation of this system, upon a shift in phase of the triple frequency signal relative to the input signal, reference is made to the FIGS. 2*d*–2*h*. FIG. 2*d* illustrates a 90° phase shift in the triple frequency signal from the condition illustrated in FIG. 2*b*. Application of this signal and the signal of FIG. 2*a* upon the AFC discriminator 42 produces the signal of FIG. 2*e* for application of the capacitor 72. Integration of the signal of FIG. 2*e*, it is apparent, produces a zero voltage.

FIG. 2*f* illustrates a 180° phase shift in the triple frequency signal from the condition illustrated in FIG. 2*b*. Application of this signal and the signal of FIG. 2*a* upon the AFC discriminator 42 produces a signal, such as is shown in FIG. 2*g*, which when integrated by the capacitor 72 produces a negative D.C. voltage.

FIG. 2*h* illustrates the integrated output appearing at the capacitor 72 as the triple frequency reference signal is continuously shifted in phase with respect to its original phase position as shown in FIG. 2*b*. It is readily seen that the wave form of FIG. 2*h* repeats every 120° with respect to the fundamental input frequency shown in FIG. 2*a*.

Thus, the input signal may be shifted in phase by 120°, as it is in the system of FIG. 3, with no change in the output of the AFC discriminator. The three points representing 0°, 120°, and 240° phase shift of the input signal are designated by the points A, B, and C in FIG. 2*h*.

It is now apparent that the capacitance of capacitor element 32 will continuously vary in response to any phase shift between the input signal as derived from limiter circuit 16, and the triple frequency signal, as it appears at the anode of tube 52. Thus, the D.C. bias voltage produced by AFC discriminator 42 may be utilized to maintain the resonant circuit 24 accurately tuned to the triple frequency of the incoming signal appearing at the antenna 10.

Although the invention has been described in conjunction with a system which utilizes an input signal which is shifted in phase by 0°, 120°, and 240°, it should be apparent to those skilled in the art that the described system is readily applicable to any keyed phase shift system wherein the input signal is multiplied and then divided by any odd integer to produce the reference signal for comparison with the input signal.

It will be further apparent to those skilled in the art that many modifications of the disclosed embodiment of this invention may be made without departing from the scope thereof which is to be measured by the appended claims.

I claim:

1. In a receiver for deriving information from a modulated carrier frequency signal having peak amplitudes at preselected phase positions, the combination comprising means including a tuned circuit connected to receive a portion of the modulated carrier frequency signal and to derive therefrom an odd harmonic signal of the modulated carrier frequency signal, and means connected to said tuned circuit for automatically tuning same to the odd harmonic of the modulated carrier frequency signal in response to the phase relationship between the modulated carrier frequency signal and the signal from said tuned circuit.

2. In a receiver for deriving information from a modulated carrier frequency signal having peak amplitudes at preselected phase positions, the combination comprising means including a tuned circuit connected to receive a portion of the modulated carrier frequency signal and to derive therefrom a particular odd harmonic signal of the modulated carrier frequency signal, and means including a phase detector circuit connected to receive and compare the modulated carrier frequency signal with the signal from said tuned circuit and responsive thereto tune the tuned circuit to the particular odd harmonic of the modulated carrier frequency signal.

3. In a receiver for deriving information from a modulated carrier frequency signal having peak amplitudes at preselected phase positions, the combination comprising means including a tuned circuit connected to receive a portion of the modulated carrier frequency signal and to derive therefrom a particular odd harmonic signal of the modulated carrier frequency signal, means connected to said tuned circuit and responsive to an error signal for tuning same to the particular odd harmonic of the modulated carrier frequency signal, and means connected to receive and compare the modulated carrier frequency signal with the signal from said tuned circuit and responsive thereto develop an error signal for application to said tuning means.

4. In a receiver for deriving information from a modulated carrier frequency signal having peak amplitudes at preselected phase positions, the combination comprising means including a tuned circuit connected to receive a portion of the modulated carrier frequency signal and to derive therefrom a particular odd harmonic signal of the modulated carrier frequency signal, means including an electron discharge device operatively connected to said tuned circuit for amplifying the odd harmonic signal derived therefrom, and means including a coil operatively connecting the output of said electron discharge device to said tuned circuit to provide a regenerative feedback for the odd harmonic signal derived therein.

5. In a receiver for deriving information from a modulated carrier frequency signal having peak amplitudes at preselected phase positions, the combination comprising means including a tuned circuit connected to receive a portion of the modulated carrier frequency signal and to derive therefrom a particular odd harmonic signal of the modulated carrier frequency signal, an electron discharge device including an anode, a cathode, and a grid, a source of operating potential for said electron discharge device, means connecting the output signal from said tuned circuit to the grid of said electron discharge device for amplification therein, and means including a coil connecting the cathode of said electron discharge device to said tuned circuit to provide a regenerative feedback for the particular odd harmonic signal derived therein.

6. In a receiver for deriving information form a modulated carrier frequency signal having peak amplitudes at preselected phase positions, the combination comprising means including a tuned circuit connected to receive a portion of the modulated carrier frequency signal and to derive therefrom a particular odd harmonic signal of the modulated carrier frequency signal, means amplifying the odd harmonic signal and providing a regenerative feedback of the particular odd harmonic signal to the tuned circuit, and means connected to receive and compare the phase of the modulated carrier frequency signal with the phase of the particular odd harmonic signal and responsive thereto tune the tuned circuit to the particular odd harmonic of the modulated carrier frequency signal.

7. In a receiver for deriving information from a phase modulated carrier signal, the combination comprising means including a squaring circuit connected to modify the carrier signal, means including a parallel resonant circuit connected to receive a signal from said squaring circuit and to produce a particular odd harmonic frequency output potential responsive thereto, means for limiting the output potential from said parallel resonant circuit, signal responsive means connected to said parallel resonant circuit for tuning same to the particular odd harmonic frequency output, and means including a phase detector connected to receive and compare the output signal from said squaring circuit with the output from said limiting circuit and responsive thereto develop a signal for application to said signal responsive means.

8. In a receiver for deriving information from a phase modulated carrier signal, the combination comprising means including a squaring circuit connected to modify the carrier signal, means including a parallel resonant circuit connected to receive a signal from said squaring circuit and to produce a particular odd harmonic frequency output potential responsive thereto, a variable reactance element connected to said parallel resonant circuit for tuning same to the particular odd harmonic frequency in response to a voltage applied thereto, means for limiting the output potential from said parallel resonant circuit, and means including a phase detector connected to receive and compare the output signal from said squaring circuit with the output signal from said limiting circuit and in response thereto develop a variable voltage for application to said variable reactance element.

References Cited in the file of this patent

UNITED STATES PATENTS 1,907,965 Hansell ---------------- May 9, 1933